Figure 1:
Figure 2:

March 1, 1949.                    D. W. KITCHIN ET AL                    2,462,977
                                      CABLE JOINT
                                  Filed March 28, 1945

POLYETHYLENE INSULATION

POLYETHYLENE – POLYISOBUTYLENE COATING

CONDUCTOR JOINT
FUSED POLYETHYLENE-POLYISOBUTYLENE COATING

ORDINARY FILL

INVENTORS
DONALD W. KITCHIN
FRANCIS R. DYKE
BY
ATTORNEYS

Patented Mar. 1, 1949

2,462,977

UNITED STATES PATENT OFFICE 2,462,977

CABLE JOINT

Donald W. Kitchin, Wellesley Hills, Mass., and Francis R. Dyke, Dartmouth, Nova Scotia, Canada, assignors to The Western Union Telegraph Company, New York, N. Y., a corporation of New York Application March 28, 1945, Serial No. 585,274

12 Claims. (Cl. 174—84)

This invention relates to improvements in the jointing of cables insulated with polyethylene.

Cables insulated with polyethylene are known, and have important advantages for many purposes, including use as submarine cable. The use of such cables has involved difficulties in making mechanically and electrically sound joints, either between two ends of cable insulated with polyethylene, or between polyethylene insulated cable and cable insulated with other materials. The methods of jointing cables heretofore used are not satisfactory with polyethylene insulated cables, because the joints so made are either electrically or mechanically unsound, or both. The insulating material may consist entirely or almost entirely of polyethylene, or may contain other materials in addition thereto, for example, may consist of 80% polyethylene and 20% polyisobutylene.

The ordinary method of insulating a joint in an insulated conductor is to scarf or pencil the ends of the insulation to be jointed and then fill in the insulation by applying in the form of tape or otherwise the same material which is used for the insulation of the cables. Commonly, the scarf is coated with a cement or other compound before the new insulation is applied, to improve the adhesion.

This method is not useful for making joints in cables insulated with polyethylene or compositions consisting largely or polyethylene or in making a joint between a cable so insulated and one insulated with another material for the reason that polyethylene itself cannot be applied as jointing insulation in such a way as to insure a reliable bond to the polyethylene insulation in the cable, except under exact factory control, which is not obtainable in the field.

The present invention provides joints which are both mechanically and electrically sound, and which permit the jointing of two cables insulated with polyethylene or compositions consisting largely of polyethylene, or one so insulated and one insulated with another material. These joints are readily made in the field or on shipboard with relatively simple equipment. They have been found to have stable electrical properties during immersion in water for several months at 158° F. (A few weeks immersion at this temperature is the equivalent of many years immersion in cold water.) Joints prepared by more conventional methods often begin to deteriorate after a short period of immersion at 158° F.

The present invention provides a method of preparing the scarf on a polyethylene insulated conductor so that materials for jointing insulation, which are bondable to rubber and much easier to work than polythylene, can be bonded to the scarf readily and reliably in the field. Specifically, the material used in the preparation of the scarf, which will be described below, or a suitable rubber insulating or "patching" compound, can be bonded to a scarf which has been prepared in accordance with the methods of this invention.

Thus a joint between two cables insulated with polyethylene will involve the following steps:

(1) Jointing of conductor.

(2) Scarfing of insulation at both sides of joint.

(3) The preparation of scarfs in accordance with this invention.

(4) Application of the joint insulating material, which may be a rubber insulating compound or the compound used in the preparation of the scarfs. The rubber insulating compound is likely to be found more convenient in many cases as it may be easily available and because experienced jointers are already familiar with the methods of handling and applying it.

A joint between a cable insulated with polyethylene and one insulated with another material involves the same steps as above but with the following differences:

(1) The scarf on the insulating material, other than polyethylene, must be prepared to give the best bond to the joint insulating material which is selected, and (2) Joint insulating material of a type which is bondable to rubber and which will bond both to the prepared polyethylene scarf and to the prepared scarf of the other material must be selected. In this case a suitable rubber insulating compound is useful because it will bond to the prepared polyethylene scarf, and methods are already known for causing it to bond closely to various other well-known insulating materials.

In accordance with the present invention, the preparation of the polyethylene scarf is done as follows: The polyethylene insulation is scarfed or penciled to provide a scarf about 5″–6″ long, tapering down to the bare conductor which extends beyond the end of the insulation a distance sufficient to permit the conductor joint, which may be any of the usual types, such as a married or scarfed joint.

The polethylene scarf is then coated with a compound containing polyethylene and a polymerized higher olefin, advantageously polyisobutylene, which may include other compounding ingredients such as anti-oxidant, deproteinized rubber, a liquid or semi-liquid polymerized olefin to increase tackiness, etc. Advantageously this bonding material is applied in the form of a thin tape which is wrapped around the scarf on the polyethylene insulation and fused thereto by heating. The coating of the bonding material causes the scarf to have an exterior surface possessing characteristics generally similar to rubber so that any joint-filling material which is bondable to rubber will make a good bond with it.

The polyethylene so coated can then be wrapped with semi-cured rubber, or unvulcanized rubber, or the bonding material, or other joint insulating material to form a joint which is both electrically and mechanically sound. It is sometimes advantageous to use an intermediate coating of cement.

When the polyethylene insulated cable is joined to another length of polyethylene insulated cable, the ends of the two cables are prepared the same way. Where the polyethylene insulated cable is joined to a cable insulated with another material, the polyethylene is prepared as described, and the other cable end is prepared in any of the customary ways.

The invention will be further illustrated in connection with the appended drawing, in which Figs. 1 to 5 inclusive illustrate the respective steps involved in the jointing of two polyethylene insulated cables in accordance with the invention.

In the procedure illustrated in the drawing, a 1″ section of the insulation is cut away from the conductor at a point about 6″ from the end of the cable as illustrated in Figure 1. A tapered scarf extending about 5″ from the junction of the insulation and the exposed conductor is then prepared. A coating of a bonding material is then wrapped on the scarfed surface, starting at a point about 1″ behind the beginning of the scarf.

A coating material advantageously used is prepared from the following ingredients:

| | Parts |
|---|---|
| Polyethylene | 150 |
| Polyisobutylene | 140 |
| Deproteinized rubber | 50 |
| Anti-oxidant (sym. di-beta-naphthyl-para-phenylenediamine) | 0.5 |
| Sulfur | 0.05 |

The polyisobutylene used in this formula preferably consists of 100 parts having a molecular weight between 50,000 and 100,000, and 40 parts having a molecular weight of about 5000. However, the 100 parts may be less highly or more highly polymerized than indicated.

This bonding material may be compounded by mixing on a 2-roll mill. The polyethylene is worked a few minutes on hot rolls, after which the 100 parts of the more highly polymerized polyisobutylene is added. When this mixture is running smoothly on the rolls, the 40 parts of the less highly polymerized polyisobutylene is added. This mixture is milled for 20 minutes, and the rolls are then cooled somewhat, and the remaining ingredients are added either successively or as a master batch. The complete mixture is milled about 10 minutes, and the rolls are then cooled until a thin sheet can be taken off. Advantageously, the stock is calendered to a sheet about 0.05″ thick. For jointing, a 1″ strip of this sheet is cut, preferably across the direction of calendering, and is pulled out nearly to the limit of stretch, for example, to a strip about ¼″ wide and 0.005″ thick.

This strip is then wrapped around the scarf of the polyethylene insulation, using a 50% overlap in a single layer, and with about 10% additional stretch in wrapping; care being taken to avoid breaking the strip and to cover the entire scarfed surface, and about 1″ of the insulation beyond the scarf, with a single strip.

Figure 3:
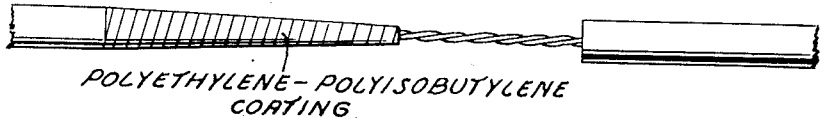

The taped surface, illustrated in Figure 3, is then heated in a hot air heater adjusted to about 400° F. for four minutes to fuse the tape to the insulation and to itself. It is then allowed to cool to room temperature.

Figure 4:
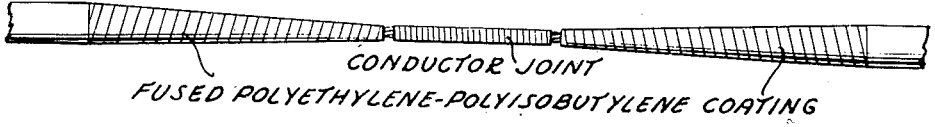

The conductor joint between this prepared cable end and the similarly prepared end of the other cable is then made, using any of the customary joints, as illustrated in Figure 4.

The taped surfaces are then briskly rubbed with a clean, lintless cloth saturated with benzol, and the benzol permitted to evaporate. A cement may then be applied to the taped surfaces, usually using two coats. The cement is permitted to dry until the surfaces are extremely sticky. Five minutes is usually sufficient for this.

Figure 5:
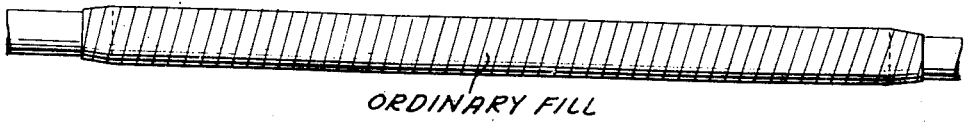

The joint is then completed by the application of a semi-cured rubber joint insulating compound, advantageously of deproteinized rubber, in the usual way, the rubber being wrapped on with about 50% overlap until the entire joint is filled up and the diameter of the tape layers is about twice that of the cores and is reasonably uniform throughout this length, as illustrated in Figure 5. The final joint is about 14″ long.

While the use of semi-cured rubber joint insulating compound has been specifically described and is advantageous, the invention is not limited to its use. Other joint insulating materials such as unvulcanized rubber or the polyethylene containing composition used as an intermediate jointing agent may be used. In particular, unvulcanized compounded rubber may be advantageously used where vulcanizing equipment is available, and the joint can be vulcanized, as in the factory.

Also, while the use of a bonding composition containing polyethylene and polyisobutylene together with compounding agents to increase its tackiness has been specifically described and is advantageous, other bonding materials, for example, a simple mixture of equal parts of polyethylene and polyisobutylene, or mixtures containing polyethylene and other high polymerized olefins, such as polyisopentene, may be used. The necessary condition for a satisfactory joint is that the polyethylene be coated with a material which is capable of bonding therewith and of bonding with the filling material to form junctions which are electrically and mechanically sound. With polyethylene, this apparently imposes the requirement that the material be capable of fusing with the polyethylene, and contain, as one ingredient, polyethylene, and as another, a polymerized olefin higher than ethylene.

It will be understood that the term "polyethylene" as used in the appended claims to designate the insulation on the cables jointed or to be jointed is intended to include insulating compositions consisting largely of polyethylene but which may include minor proportions of other materials, as is the case with mixtures of 80% polyethylene and 20% polyisobutylene.

We claim:

1. In the jointing of a cable insulated with polyethylene wherein the joint is filled with a material bondable to rubber, the step of applying to the polyethylene insulation a coating, fusible with polyethylene, containing polyethylene and a polymerized olefin higher than ethylene.

2. The method of preparing the end of a polyethylene insulated cable for jointing and subsequent bonding with a joint-filling material bondable to rubber which includes forming a scarf thereon and covering the scarf with a layer of material, fusible with the polyethylene, containing polyethylene and a polymerized olefin higher than ethylene.

3. In the jointing of a cable insulated with polyethylene wherein the joint is filled with a material bondable to rubber, the step of applying to the polyethylene insulation a coating, fusible with polyethylene, containing polyethylene and polyisobutylene.

4. The method of preparing the end of a polyethylene insulated cable for jointing and subsequent bonding with a joint-filling material bondable to rubber which includes forming a scarf thereon and covering the scarf with a layer of material, fusible with the polyethylene, containing polyethylene and polyisobutylene.

5. In the jointing of a cable insulated with polyethylene to another cable, the steps of forming a scarf thereon, applying to the scarfed polyethylene a coating containing polyethylene and polyisobutylene, preparing the insulation of the other cable, forming the conductor joint, and applying a filling material which is bondable to rubber.

6. A cable joint between two cable ends, at least one of which is that of a polyethylene-insulated cable, including a joint insulating material bondable to rubber, and between the polyethylene and the joint insulating material, a layer containing polyethylene and a polymerized olefin higher than ethylene.

7. A cable joint between two cable ends, at least one of which is that of a polyethylene-insulated cable, including a joint insulating material bondable to rubber, and between the polyethylene and the joint insulating material, a layer containing polyethylene and polyisobutylene.

8. In the jointing of a cable insulated with polyethylene to another cable wherein the joint is filled with a material bondable to rubber, the steps of applying to the scarfed polyethylene a coating containing polyethylene and polyisobutylene, and heating the coated surface to fuse the coating to the polyethylene.

9. In the jointing of a cable insulated with polyethylene wherein the joint is filled with a material bondable to rubber, the step of applying to the polyethylene insulation a coating, fusible with polyethylene, containing approximately equal amounts of polyethylene and a polymerized olefin higher than ethylene.

10. In the jointing of a cable insulated with polyethylene wherein the joint is filled with a material bondable to rubber, the step of applying to the polyethylene insulation a coating, fusible with polyethylene, containing approximately equal amounts of polyethylene and polyisobutylene.

11. A cable joint between two cable ends, at least one of which is that of a polyethylene-insulated cable, including a joint-insulating material bondable to rubber, and between the polyethylene and the joint-insulating material, a layer containing approximately equal amounts of polyethylene and a polymerized olefin higher than ethylene.

12. A cable joint between two cable ends, at least one of which is that of a polyethylene-insulated cable, including a joint-insulating material bondable to rubber, and between the polyethylene and the joint-insulating material, a layer containing approximately equal amounts of polyethylene and polyisobutylene.

DONALD W. KITCHIN.
FRANCIS R. DYKE.

REFERENCES CITED

The following references are of record in the file of this patent:

UNITED STATES PATENTS

| Number | Name | Date |
|---|---|---|
| 2,145,350 | Haslam | Jan. 31, 1939 |
| 2,339,958 | Sparks | Jan. 25, 1944 |
| 2,340,452 | Child et al. | Feb. 1, 1944 |
| 2,369,471 | Latham | Feb. 13, 1945 |
| 2,377,153 | Hunter | May 29, 1945 |
| 2,393,935 | Scott | Jan. 29, 1946 |